US005850390A

United States Patent [19]
Ramel

[11] Patent Number: 5,850,390
[45] Date of Patent: Dec. 15, 1998

[54] METHOD FOR MANAGING RADIO RESOURCES WHICH TRANSMITS USER DATA/INFORMATION FIELD WITHIN A TIME/FREQUENCY PARALLELOGRAM SEPARATED FROM THE HEADER CHANNEL BY A PLURALITY OF FREQUENCIES

[75] Inventor: Louis Ramel, Aunay Sous Auneau, France

[73] Assignee: Thomson-CSF, Paris, France

[21] Appl. No.: 641,747

[22] Filed: May 2, 1996

[30] Foreign Application Priority Data

May 23, 1995 [FR] France ................................. 95 06123

[51] Int. Cl.⁶ ............................. H04Q 7/00; H04J 4/00; H04J 3/24
[52] U.S. Cl. ....................... 370/330; 370/436; 370/478; 370/349; 375/204
[58] Field of Search ..................................... 370/330, 436, 370/478, 349, 389, 310; 375/204

[56] References Cited

U.S. PATENT DOCUMENTS

| 5,022,046 | 6/1991 | Morrow, Jr. ................................. 375/1 |
| 5,084,901 | 1/1992 | Nagazumi ................................. 375/204 |

FOREIGN PATENT DOCUMENTS 0 667 695  8/1995  European Pat. Off. .

WO 93/04546  3/1993  WIPO .

OTHER PUBLICATIONS

Lester LeBlanc, "Multi–Frequency Shift Key and Differential Phase Shift Key for Acoustic Modem," Autonomous Underwater Vehicle Technology, IEEE, pp. 160–166, Jul. 1996.

S. Mann & S. Haykin, "Chirplets and Warblets: Novel Time–Frequency Methods," Electronics Letters, vol. 28, No. 2, pp. 114–116, Jan. 16, 1992.

*Primary Examiner*—Douglas W. Olms
*Assistant Examiner*—David R. Vincent
*Attorney, Agent, or Firm*—Oblon, Spivak, McClelland, Maier & Neustadt, P.C.

[57] ABSTRACT

The disclosure relates to the transmission of data by packets, in a network, with a search for an optimum use of the allocated band of frequencies. The packets are all formed by a header followed by an information field. The headers are all sent out on the same carrier frequency and the radio resources allocated to an information field are limited to a parallelogram demarcated by two first parallels corresponding to two fixed frequencies external to the frequencies allocated to headers and by two second parallels that have the same frequency/time slope for all the packets and whose position in time is deduced from the observation of the header. Thus, with knowledge of the resources used by the packets that are being transmitted, a terminal may send out a new packet as closely as possible to the packets that are being transmitted, but without any risk of interference with these packets. Application to transmission by packets.

5 Claims, 4 Drawing Sheets

METHOD FOR MANAGING RADIO RESOURCES WHICH TRANSMITS USER DATA/INFORMATION FIELD WITHIN A TIME/FREQUENCY PARALLELOGRAM SEPARATED FROM THE HEADER CHANNEL BY A PLURALITY OF FREQUENCIES

BACKGROUND OF THE INVENTION

The present invention relates to the sharing of radio resources during the transmission of packets in a radio network with decentralized management of the packets by terminals making simultaneous use of radio channels that are different in terms of carrier frequency and bandwidth.

The width of a channel is defined by the difference, at a given instant, between the highest frequency and the lowest frequency used.

It is very difficult for a terminal, without prior information, to know by listening alone that another terminal is transmitting on a channel and to know the width of this channel. For this, it is necessary, at least, to have precise knowledge of the central frequency as well of as the type and speed of modulation or the precise width of the channel.

In the context of decentralized architecture, namely when there is no master station, the terminals require real-time knowledge of all the radio resources used. This knowledge is very difficult to obtain as has been explained in the above paragraph.

There are known ways of seeing to it that, in order to avoid inter-packet interference, the terminals use different channels. However, in this case, they are incapable of communicating with one another if they are on different channels and hence of exchanging the information needed for the management of the radio resources. The use of the frequency band allocated to the radio network is therefore far from being at its optimum.

SUMMARY OF THE INVENTION

The aim of the present invention is to optimize the use of the radio resources of the band allocated to a network.

This is obtained by working with packets that are constituted by a header followed by a field of useful radio information and in which, in particular, all the headers are sent out in one and the same frequency band in a specific format with information on the field that follow them and in which all the fields are sent out with particular characteristics, especially as regards their band of transmission frequencies.

According to the present invention, there is provided a method for the management of radio resources in a given frequency band during the transmission of packets each formed by a header with a given duration followed by a field of useful radio information, this method consisting of the transmission of all the headers in channels called header channels, on one and the same given carrier frequency, with a given width of header channel for a given packet, the limiting of the radio resources allocated to the information field of a given packet to a parallelogram that is separated, in terms of frequency, from the header channels and is demarcated by two first parallels corresponding to a first end frequency and second end frequency where the first end frequency is one of the limits of the given frequency band and the second end frequency is a frequency called an original frequency that is constant for all the resources and that ranges between the carrier frequency and the first end frequency, and by two second parallels having the same frequency/time slope for all the packets and passing through the original frequency respectively at the end of periods of time x and x+$d_c$, these periods of time being counted from the start of the header of the given packet, x being constant for all the packets and $d_c$ being a specific duration that is associated with the given packet and is at least as long as the duration of the header of the given packet, and wherein the transmission of a packet is started only if the carrier frequency is free and only with a delay with respect to the start of the packet that precedes the given packet, this delay being at least equal to the specific duration $d_c$ associated with the packet that precedes the given packet.

BRIEF DESCRIPTION OF THE DRAWINGS

The present invention will be understood more clearly and other characteristics shall appear from the following description and from the appended figures, of which.

MORE DETAILED DESCRIPTION

Hereinafter and in the claims, reference shall be made to packets, and these packets are each provided with a header. This header is formed by a sequence of bits all sent out on one and the same carrier frequency. Among the bits of a header, the first bits have a synchronizing function and those that follow enable the management of the exchange of information.

Figure 1:
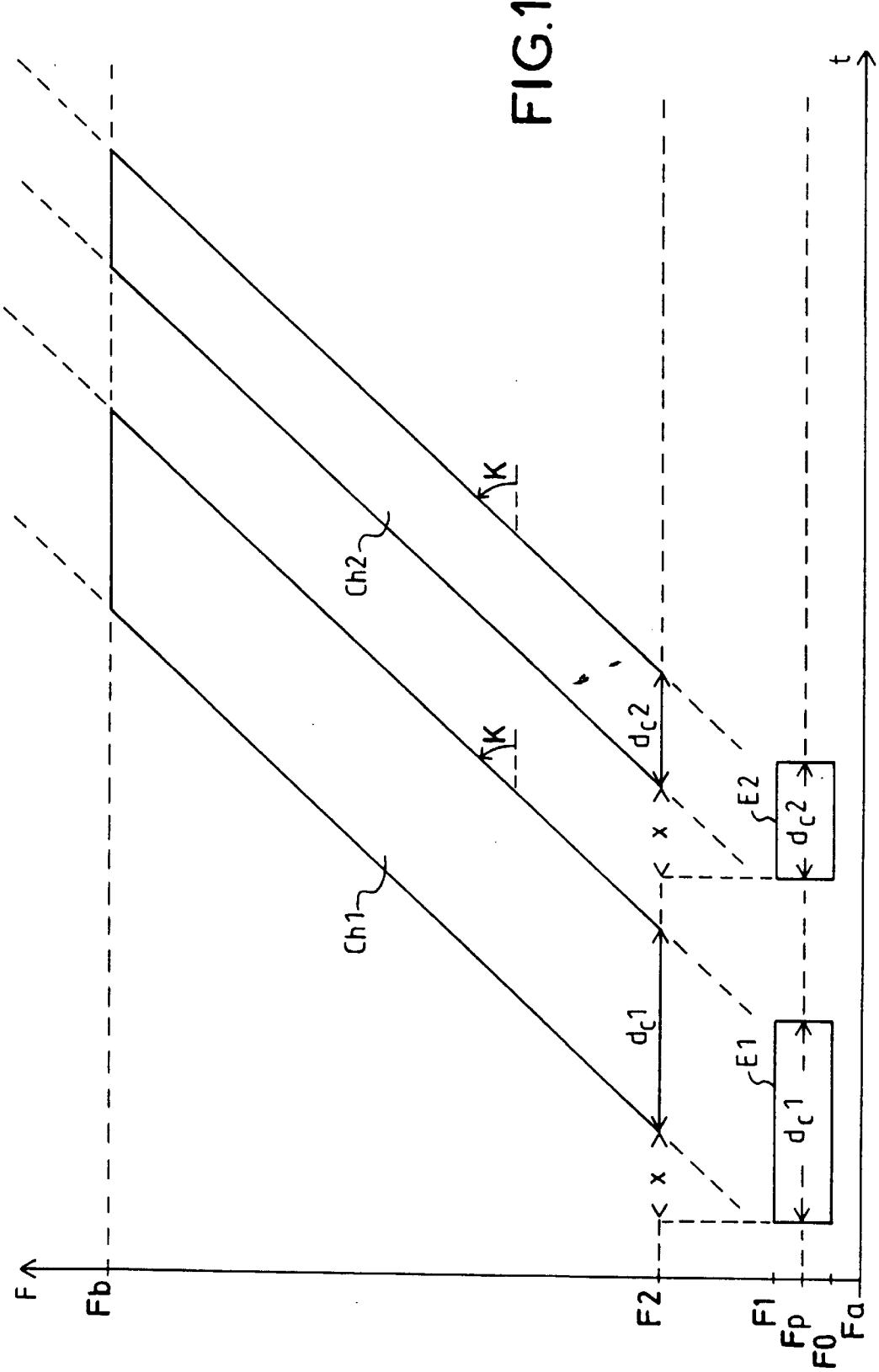
FIGS. 1, 2 and 3 are graphs used to illustrate the radio resources allocated to the packets by the method according to the invention.

FIG. 1 gives a view of how, in a transmission network, two packets are prepared according to the method. In this figure, as in FIGS. 2 and 3, the constant values are written in bold letters.

FIG. 1 is a graph with time represented on the X axis and frequency on the Y axis. Each of the two packets represented has a header, E1, E2, followed by an information field sent out within a parallelogram of reserved radio resources Ch1, Ch2.

The following rules govern the preparation of the packets according to FIG. 1:

the transmission frequencies are naturally all contained within the frequency band Fa–Fb allocated to the transmission network, the headers are all sent out on one and the same given carrier frequency Fp, in channels known as header channels with a width that is constant but may vary from one channel to another, the radio resources allocated to the field of information of a packet are limited to a parallelogram that is separated, in terms of frequency, from the header channels and demarcated by: two first parallels corresponding to a first frequency and a second frequency where the first frequency is one of the limits, Fb, of the frequency band allocated to the network, and the second frequency is a frequency F2 called an original frequency that is constant for all the resources and that ranges between the carrier frequency Fp and the first end frequency Fb; and two second parallels having the same frequency/time slope K for all the packets and passing through the original frequency respectively at a period of time x, with x as a predetermined constant for all the packets, after the start of the header of the packet considered and a period of time $x+d_c$ after the start of the header, where $d_c$ is a specific duration that is associated with the packet and that shall be specified hereinafter, a packet cannot start being sent out unless the carrier frequency Fp is free, and its delay with respect to the start of the previous packet must at least be equal to the specific duration $d_c$ associated with the previous packet; of course, if this duration $d_c$ cannot be determined, the delay will be taken to be at least equal to the maximum value capable of being reached by the duration $d_c$, the value $d_c$ associated with the packet may be the width of the packet, an information element contained in the packet or a predetermined value that is constant for all the packets.

The headers E1, E2 shown in FIG. 1 are sent out on channels of the same width and it is the duration $d_c1$, $d_c2$ of these headers that constitutes the duration $d_c$ referred to further above.

Since the packets are defined, as seen here above, by the start of their header and their associated value $d_c$, it is enough, in order that a terminal of a network may start transmitting a packet, that it should know the constant values Fp, F2, x and K, that it should monitor the transmission of headers by the other terminals and that it should start sending out a packet with a delay in relation to the start of the previous packet that is at least equal to the duration $d_c$ associated with the previous packet.

The case where a terminal has to recognize the start and the duration of the headers being transmitted in order to be able to decide, of its own accord, to transmit a packet is an interesting one. Indeed, the headers may be sent out in header channels that have different widths from one packet to another but are constant for one and the same packet. To obtain knowledge of the radio resources used by the other terminals, a terminal observes the power received in the vicinity of the carrier frequency in order to measure the duration of headers sent out by these other terminals. Since this frequency is identical for all the headers of all the packets, it is very easy to carry out this observation.

Figure 2:
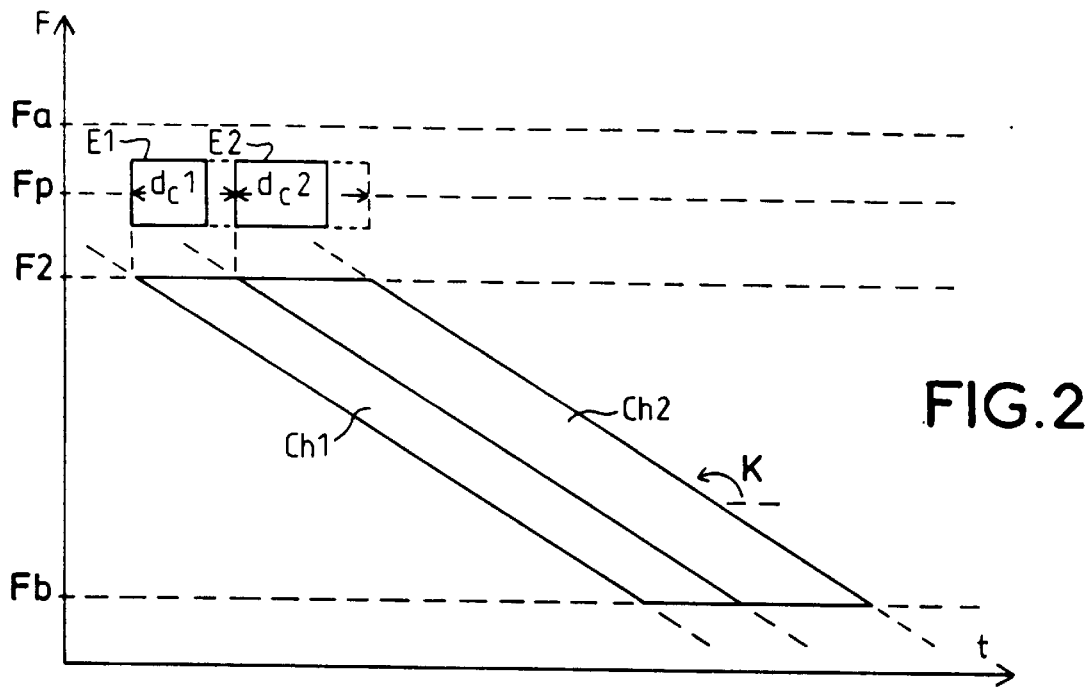

FIG. 2 illustrates the case of the dispatch of two successive packets in one and the same network with header channels all of the same width and with values of duration $d_c1$, $d_c2$ given by information contained in the headers. Each duration $d_c1$, $d_c2$ is necessarily greater than or equal to the duration of the header that it contains. In the present case they are greater.

In FIG. 2, the value x as defined in the description of FIG. 1 is zero. Furthermore, it must be noted that, in FIG. 2, the two reserved radio resources Ch1, Ch2 are contiguous. This means that this is the particular case where the second of the two packets has been sent as closely as possible to the first packet thus providing for a maximum use of the frequency/time domain.

It must also be noted, with respect to the two packets according to FIG. 2, that their headers are at frequencies greater than those of the radio resources allocated to their information fields. The result of this is that these radio resources develop along a negative slope.

Figure 3:
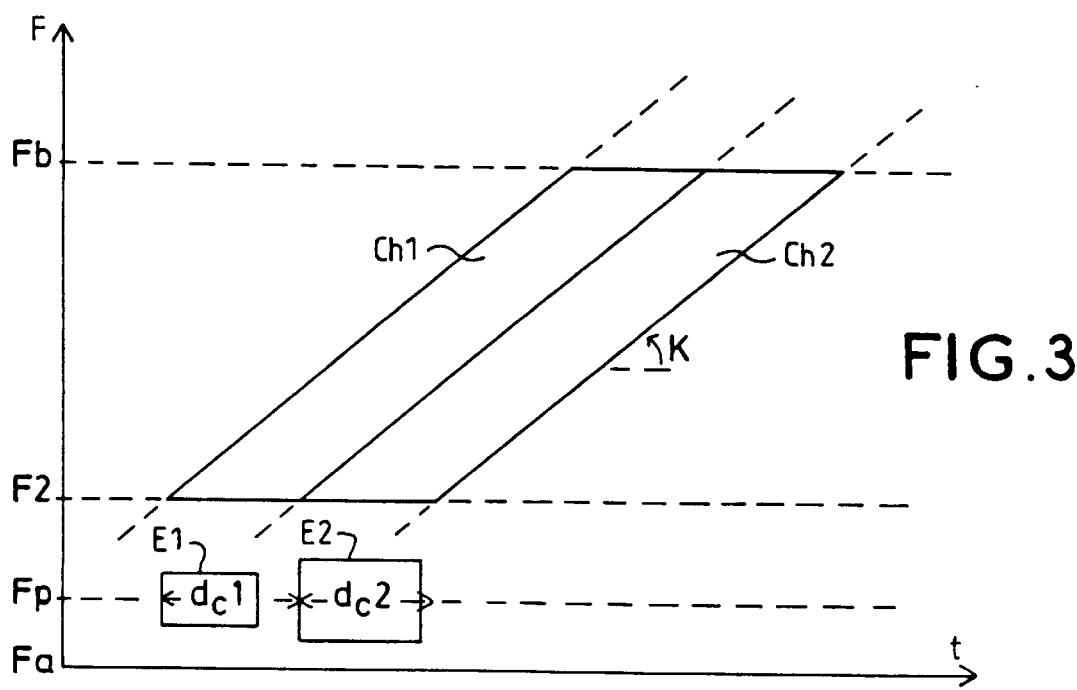

FIG. 3 illustrates the case of the dispatch of two successive packets in one and the same network with header channels of different widths. In this figure, the values of duration $d_c1$, $d_c2$ are equal to one and the same known predetermined duration of all the terminals of the network, and the value x, as defined with FIG. 1, is zero. Furthermore, it must be noted that the two reserved radio resources Ch1, Ch2 are contiguous, the second of the two packets being, as in the case of FIG. 2, sent out as closely as possible to the first one.

The exemplary embodiments of a transmitter and a receiver that shall be described with reference to FIGS. 4 and 5 relate to equipment for the implementation of the method, enabling the use of the radio resources while remaining within the parallelogram and the header channels described here above. Since the originality of the method lies in operation within these boundaries, the transmitters according to FIG. 4 and the receivers according to FIG. 5 are very close to known transmitters and receivers, from which they are distinguished above all in their working protocols as described here above. In fact, with these protocols being known, the making of a transmitter and a receiver capable of applying them raises no problems for those skilled in the art who, on the contrary, will find certain facilities in this respect. It is therefore possible, hereinafter, to leave out all that pertains to current technology and does not contribute to an understanding of the examples of implementation of the method. The drawings of these examples become clearer and the explanation is thereby simplified.

Figure 4:
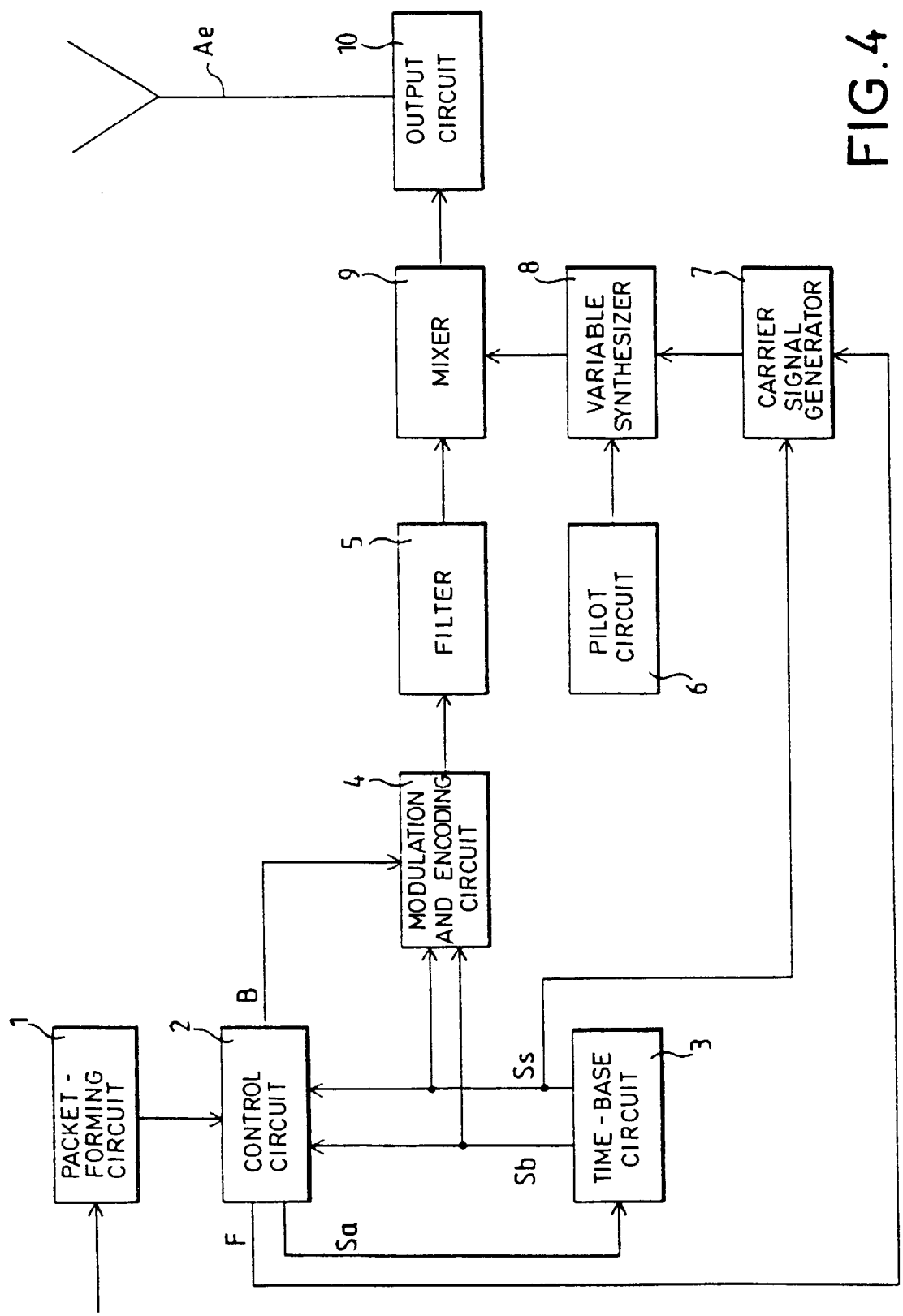
FIGS. 4 and 5 are respectively the drawings of a transmitter and a receiver for the implementation of the method according to the invention.
Figure 5:
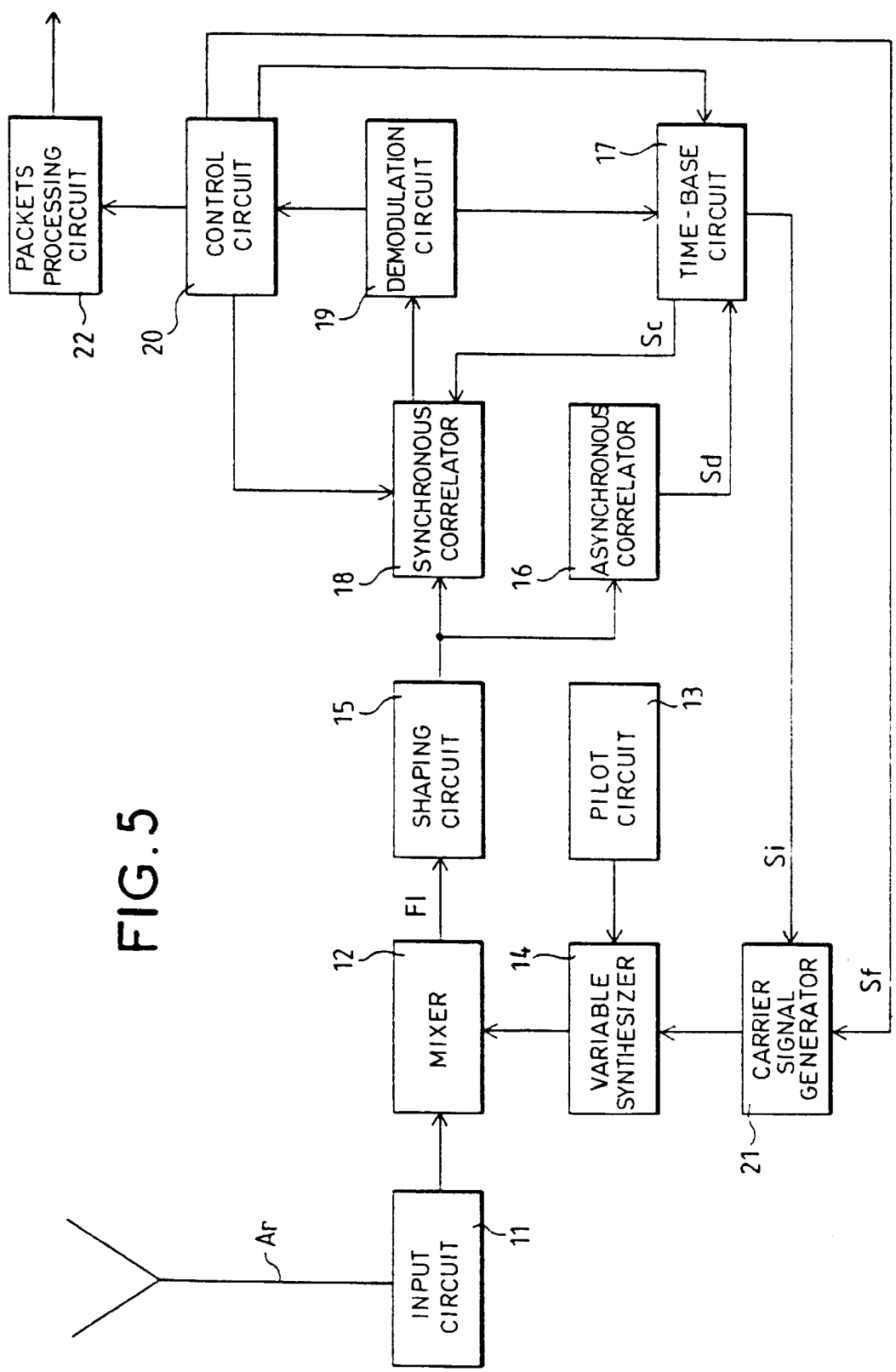

FIG. 4 is an electrical diagram pertaining to a transmitter for the implementation of the method.

The data bits D to be transmitted are given to a packet-forming circuit 1 which, depending on the bits that it receives, delivers packets to a control circuit 2. The role of the circuit 2 is to introduce information into the packet and organize the operations for the transmission of the packet. A time-base circuit 3 delivers the synchronization signals needed for the spreading operations. The circuit 3 is activated by a signal Sa given by the circuit 2 whenever it has to start the operations for spreading a packet.

To organize the spreading operations, the control circuit 2 has information available on the radio resources allocated to the packet and on the characteristics of the packet to be transmitted. It may thus organize the operations in keeping with the characteristics of the packet.

The control circuit 2 receives pulses from the time-base circuit 3 for the synchronization of the bits Sb and the synchronization of the starting points of the segments Ss, namely the synchronization of the header and of the information field. It may thus provide groups of bits B that correspond to the spreading desired for the transmission of the packet considered.

A modulation and encoding circuit 4 receives the signal B and the synchronization signals Sb, Ss. It gives a modulated signal formed by segments to which there are applied the encoding operations specified by the control circuit 2. After filtering in a filter 5, this packet to which spreading relationships are applied reaches the first input of a mixer 9 which, at a second input, receives a carrier frequency signal whose value is determined, for each packet, by the signal F corresponding to the segment, header or information field considered. The carrier frequency signal pertaining to the segment that reaches the first input of the mixer 9 is prepared by a variable synthesizer 8 receiving a signal at a fixed frequency given by a pilot circuit 6 and a signal to control its output frequency, formed by a voltage given by a carrier signal generator 7. To give this voltage, the generator 7, which is synchronized by the synchronization signals Ss for synchronizing the starting points of the segments, receives the signal F whose value indicates the voltage to be delivered by the generator 7 and hence the frequency to be delivered by the synthesizer 8.

Depending on the signals that it receives on its two inputs, the mixer 9 therefore delivers packets formed by segments at its output.

An output circuit 10 comprising a wideband filter at input and a power amplifier at output receives the signal prepared by the mixer 9 and gives packets to an antenna Ae.

To receive these packets, there is proposed a receiver according to FIG. 5. This receiver has a reception antenna Ar connected to an input circuit 11 comprising, in series, a preamplifier and a wideband filter. The circuit 11 is connected to the first input of a mixer 12 which, at a second input, receives the output signal from a variable synthesizer 14. This synthesizer receives a signal at fixed frequency from a pilot circuit 13. The signal at intermediate frequency delivered by the mixer 12 is shaped in a shaping circuit 15 comprising a filter followed by an amplifier with automatic gain control.

The mixer 12, by means of the synthesizer 14 whose operation shall be seen further below, gives a signal at constant intermediate frequency modulated by information contained in the packets sent out by the transmitter according to FIG. 4. After passing into the circuit 15, this signal is applied to the input of two correlators 16, 18. The correlator 16 is an asynchronous correlator which has the role of searching for headers in its input signal.

When a header is found by the correlator 16, a packet starting signal Sd is delivered by the correlator 16 to a time-base circuit 17 which gives a synchronization signal Sc to the synchronous correlator 18. The frequency of the signal Sc, when this signal is set off by the signal Sd, corresponds to the theoretical value of the intermediate frequency. The correlator 18 is connected to the input of a demodulation circuit 19 which is itself connected to the input of a control circuit 20, and the circuit 20 has an output connected to the control input of the synchronous correlator 18 to give it the characteristics of the radio resources, header included, to be used for the packet. The circuits 18, 19, 20 therefore form a loop.

The control circuit 20 is the counterpart of the control circuit 2 of the transmitter according to FIG. 4. Its main role is to organize the operations for compressing the received packets. For this purpose it has available the characteristics of the radio resources, header included, as well as laws of application of these resources. When the asynchronous correlator 16 finds a header, it activates the synchronous correlator 18, the correlator 18 being set initially to perform a compression corresponding to the characteristics of the packet. The demodulation circuit 19 receives this signal and demodulates it to give it to the control circuit 20 which, knowing the structure of the packet, can find out the specific configuration of the spreading as and when the bits arrive. Thus, the circuit 20 can activate the synchronous correlator 18 so that the compression used at a given time in the correlator corresponds to the spreading of the signal at its input connected to the output of the circuit 15.

The control circuit 20 can thus give compressed packets to a packet processing circuit 22 and this circuit delivers the information contained in the packets to one or more addressee users.

The demodulation circuit 19 is connected to an input of the time-base circuit 17 to synchronize the circuit 17 with the bits obtained by demodulation in the circuit 19.

The control circuit 20 can also have a role of reading information in the header of the packet, such as the address of the sender or the receiver of the packet in order, for example, to stop a packet not addressed to the receiver from being taken into account. But above all, the control circuit 20 plays a major role, that has not yet been mentioned, in the control of the variable synthesizer 14. Indeed, as and when it identifies a start of a segment, it gives the time-base circuit 17 a segment starting pulse so that the circuit 17 can prepare a signal to synchronize the start of a segment Si. The signal Si is sent to an authorization input of a carrier signal generator 21 whose output gives a control voltage to control the frequency of the variable synthesizer 14. The value of this control voltage is a function of the value of a signal Sf given to the generator 21 by the control circuit 20, and the value of Sf is modified by the circuit 20 as and when segments appear and by the making of a choice, from its list of frequencies, of the frequency corresponding to the segment received at a given time. Thus activated, the variable synthesizer 14 enables the mixer 12 to carry out the frequency compression and therefore to give the signal at constant intermediate frequency applied to the input of the shaping circuit 15.

What is claimed is:

1. A method for managing radio resources in a predetermined frequency band during transmission of a plurality of packets, each one of said plurality of packets having a header and an information field, wherein each said header is transmitted in a header channel on a predetermined carrier frequency, said header channel has a predetermined width w which is constant for said plurality of packets, current packet $P_c$ denotes a current one of said plurality of packets to be transmitted, $header_c$ denotes said header for said current packet $P_c$, information field$_c$ denotes said information field for said current packet $P_c$, previous packet $P_{c-1}$ denotes a previous one of said plurality of packets to be transmitted immediately before said current packet $P_c$, $header_{c-1}$ denotes header for said previous packet $P_{c-1}$, information field$_{c-1}$ denotes said information field for said previous packet $P_{c-1}$, x is a predetermined constant for said plurality of packets, $d_c$ is a duration of time associated with said current packet $P_c$ which is at least as long as a time required to transmit said $header_c$ of said current packet $P_c$, and $d_{c-1}$ is a duration of time associated with said previous packet $P_{c-1}$ which is at least as long as a time required to transmit said $header_{c-1}$ of said previous packet $P_{c-1}$, the method comprising the steps of:

determining whether said carrier frequency is free;

determining, when said current packet $P_c$ is to be preceded in transmission by said previous packet $P_{c-1}$, whether a delay time of at least $d_{c-1}$ has passed since a start of transmission of said previous packet $P_{c-1}$;

successively repeating said step of determining whether said carrier frequency is free and said step of determining, when said current packet $P_c$ is to be preceded in transmission by said previous packet $P_{c-1}$, whether said delay time of at least $d_{c-1}$ has passed since said start of transmission of said previous packet $P_{c-1}$ until it is determined simultaneously that said carrier frequency is free and said delay time of at least $d_{c-1}$ has passed since said start of transmission of said previous packet $P_{c-1}$ when said current packet $P_c$ is to be preceded in transmission by said previous packet $P_{c-1}$;

creating said $header_c$ for said current packet $P_c$;

transmitting said $header_c$ in said header channel having said width w on said carrier frequency starting at a time $s_c$ for a length of time less than or equal to $d_c$;

creating said information field$_c$ for said current packet $P_c$; and transmitting said information field$_c$ starting at time $s_c+x$ for said duration of time $d_c$ within a time/frequency parallelogram separated from said header channel by a plurality of frequencies and demarcated by a constant first end frequency corresponding to a limit of said frequency band, a constant second end frequency having a value between said carrier frequency and said first end frequency, a first variable frequency having a predetermined frequency/time slope common to each one of said plurality of packets and passing through said second end frequency at time $s_c+x$, and a second variable frequency passing through said second end frequency at time $s_c+x+d_c$, parallel to said first variable frequency, whereby each said information field is transmitted within a first frequency domain, each said header is transmitted within a second frequency domain, and said first frequency domain is separate from said second frequency domain.

2. A method according to claim 1, wherein said duration of time $d_c$ is equal to a length of time required to transmit said $header_c$ of said current packet $P_c$.

3. A method according to claim 1, wherein a duration of time $d_c$ is a length of time having a value element included in said $header_c$ of said current packet $P_c$ as an information element.

4. A method according to claim 1, wherein said duration of time $d_c$ is a predetermined length of time that is the same for each one of said current packet $P_c$ of said plurality of packets.

5. A method for managing radio resources in a predetermined frequency band during transmission of a plurality of packets, each one of said plurality of packets having a header and an information field, wherein current packet $P_c$ denotes a current one of said plurality of packets to be transmitted, $header_c$ denotes said header for said current packet $P_c$, information $field_c$ denotes said information field for said current packet $P_c$, previous packet $P_{c-1}$ denotes a previous one of said plurality of packets to be transmitted immediately before said current packet $P_c$, $header_{c-1}$ denotes said header for said previous packet $P_{c-1}$, information $field_{c-1}$ denotes said information field for said previous packet $P_{c-1}$, x is a predetermined constant for said plurality of packets, $d_c$ is a duration of time associated with said current packet $P_c$ which is at least as long as a time required to transmit said $header_c$ of said current packet $P_c$, and $d_{c-1}$ is a duration of time associated with said previous packet $P_{c-1}$ which is at least as long as a time required to transmit said $header_{c-1}$ of said previous packet $P_{c-1}$, the method comprising the steps of:

determining whether a carrier frequency is free;

determining, when said current packet $P_c$ is to be preceded in transmission by said previous packet $P_{c-1}$, whether a delay time of at least $d_{c-1}$ has passed since a start of transmission of said previous packet $P_{c-1}$;

successively repeating said step of determining whether said carrier frequency is free and said step of determining, when said current packet $P_c$ is to be preceded in transmission by said previous packet $P_{c-1}$, whether said delay time of at least $d_{c-1}$ has passed since said start of transmission of said previous packet $P_{c-1}$ until it is determined simultaneously that said carrier frequency is free and said delay time of at least $d_{c-1}$ has passed since said start of transmission of said previous packet $P_{c-1}$ when said current packet $P_c$ is to be preceded in transmission by said previous packet $P_{c-1}$;

creating said $header_c$ for said current packet $P_c$;

transmitting said $header_c$ in a header channel having a width $w_c$ on said carrier frequency starting at a time $s_c$ for a length of time less than or equal to $d_c$;

creating said information $field_c$ for said current packet $P_c$; and transmitting said information $field_c$ starting at time $s_c+x$ for said duration of time $d_c$ within a time/frequency parallelogram separated from said header channel by a plurality of frequencies and demarcated by a constant first end frequency corresponding to a limit of said frequency band, a constant second end frequency having a value between said carrier frequency and said first end frequency, a first variable frequency having a predetermined frequency/time slope common to each one of said plurality of packets and passing through said second end frequency at time $s_c+x$, and a second variable frequency passing through said second end frequency at time $s_c+x+d_c$, parallel to said first variable frequency, whereby each said information field is transmitted within a first frequency domain, each said header is transmitted within a second frequency domain, and said first frequency domain is separate from said second frequency domain.

* * * * *